United States Patent Office 3,128,630
Patented Apr. 14, 1964

3,128,630
MEASUREMENT AND CONTROL OF THICKNESS IN THE PRODUCTION OF SHEET AND STRIP MATERIAL
Peter Richard Ashworth Briggs, Sheffield, England, assignor to Davy and United Engineering Company Limited
Filed Mar. 22, 1960, Ser. No. 16,823
Claims priority, application Great Britain Mar. 24, 1959
2 Claims. (Cl. 73—432)

This invention relates to indicating and controlling apparatus and is concerned with the indication of the value of a variable which depends on a measurable variable quantity or quantities. One application of the invention is to a rolling mill where it is desired to indicate the thickness, or the departure of that thickness from a desired value, of strip issuing from the mill, not by measuring the strip thickness itself, but by measuring variables of the mill and deriving from those variables a measure of the strip thickness.

It is frequently desirable when deriving the value of the variable from the variable quantity or quantities to assume a certain relationship between the variable and the quantity or quantities which holds good over a large range of values of one of the variables. Thus in United States Patents 2,680,976, 2,680,978, and 2,726,541 there are disclosed thickness measuring apparatuses which depend on the premise that, when the rolls and housings of a mill are subject to load by the material being rolled, the working surfaces of the rolls are forced apart a distance proportional to the separating force applied to the rolls by the material. This premise is substantially correct for values of separating force above a critical value.

However, it may be that the assumed relationship between the variable and the variable quantity or quantities is not exactly true for at least some of the values of the quantity or quantities. Thus in the case of the rolling mill, the premise is not exactly correct for values of the separating force below a critical value, while this has not been detrimental in the past as mills have operated above the critical value of separating force, newly designed mills may operate below the critical value.

The invention broadly resides in apparatus for indicating the value of a variable in which another variable quantity is measured and a first signal representing the variable is derived in a prescribed relationship to the measured quantity, and a compensation signal is generated and combined with the first signal in order to compensate for departures of the actual relationship between the variable and the quantity from the prescribed relationship. When applied to a rolling mill, for example, the variable may be the thickness of the material issuing from the mill and the variable quantity may be the separating force, in which case the prescribed relationship is a linear one.

The invention includes apparatus for indicating the departure from a desired value of the thickness of elongate material issuing from between rolls or dies, comprising means for generating signals in accordance with the separating force developed between the rolls or dies by the material therebetween, the nominal setting of the rolls or dies, and the desired thickness of the material, means for generating an error compensating signal in accordance with the difference between the distance by which the separation of the working surfaces of the rolls or dies is increased from the nominal setting by the separating force when calculated by linear proportionality from the separating force signal and the actual said distance, and combining together the four signals to form a resultant signal representing the departure of the thickness from the desired value. By the term "nominal setting of the rolls or dies" is meant the separation of the working surfaces of the rolls or dies when there is no material therebetween. When the rolls are forced together, the nominal setting is negative and has the value that would result if the rolls could pass through one another without hindrance.

The invention will be more readliy understood by way of example from the following description of an automatic gauge control system for a strip rolling mill, reference being made to the accompanying drawings in which FIGURE 1 is a schematic illustration of the mill and the control system therefor.

Figure 1:
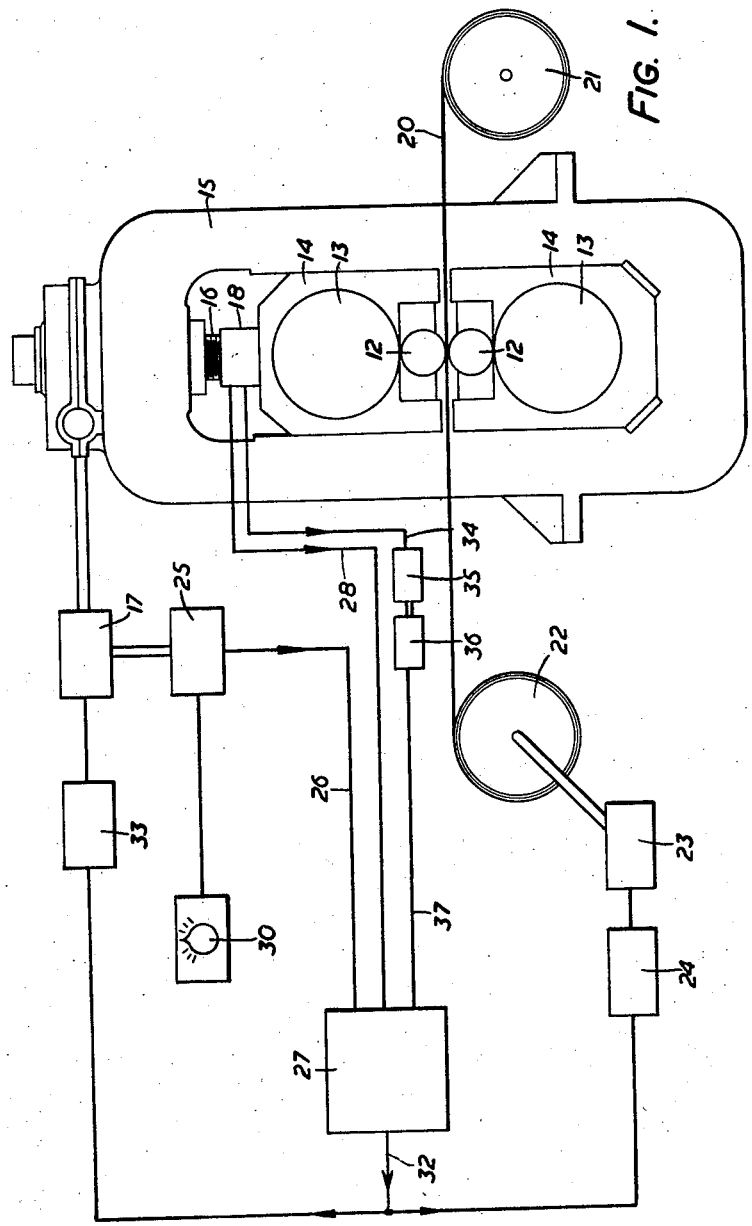

In FIGURE 1, the mill is represented by a pair of work rolls 12, a pair of back-up rolls 13, chocks 14 in which the back-up rolls 13 are located and a mill frame 15 in which the chocks 14 are slidably arranged. Two screws 16 driven by an electric screw-down motor 17 act on the upper chocks 14 at each end of the rolls, load cells 18 being interposed between the bottom of the screws and the tops of the upper chocks 14. Each load cell 18 is of known form, comprising a steel block having secured to it two sets of strain gauges, each set being connected in the form of a resistance bridge. The strip 20 is drawn off a reel 21 and between the work rolls 12 by a take-up reel 22 driven by a reeling motor 23, which is controlled by a speed control circuit 24.

The motor 17 also drives a potentiometer 25, so that an electric signal is given on line 26 according to the nominal separation of the work rolls 12. This signal is applied to a control circuit 27. The signals from one set of strain gauges of the load cells 18 are combined and applied on line 28 to the control circuit 27. The desired thickness of the strip is set up by a manually adjustable control knob 30, and the signal from potentiometer 25 is modified accordingly. The control circuit 27 derives from the signals on lines 26, 28 an error signal on an output line 32 representing the deviation of the thickness of the strip leaving the mill from the desired value as set up by knob 30. This error signal is applied to contactor gear 33 controlling screw-down motor 17 and/or to the control circuit 24, in order to adjust the thickness of the strip issuing from the mill by controlling the screw-down of the mill and/or the tension in the strip, so as to maintain the thickness error within a prescribed tolerance.

Assuming that there is a linear relationship between the separating force and the resulting elongation of the mill housings, the gauge error $\Delta h$, or the deviation of the strip thickness from the required thickness $h$ set by the knob 30, is given by the following equation:

$$F/M + S_0 - h = \Delta h$$

where F is the rolling load or separating force in tons as measured by the strain gauge bridges on the load cells 18, M is the mill modulus, or mill spring, a value ascertained by dividing the load in tons applied to the housings of the mill by the distance in inches by which the housings are extended under that load, the term "housings of the mill" being understood as including the mill frame 15, the work rolls 12 and the back-up rolls 13 and, $S_0$ is the nominal height of the roll gap, or the nominal separation of the working surfaces of the rolls 12, when there is no strip between the rolls 12; where the rolls 12 are forced together when there is no strip therebetween, $S_0$ has a negative value corresponding to the position of the rolls, supposing that they are able to pass through each other without hindrance; $S_0$ is in practice measured by the angle through which the screws 16 are turned and is therefore measured by the signal from potentiometer 25.

Figure 3:
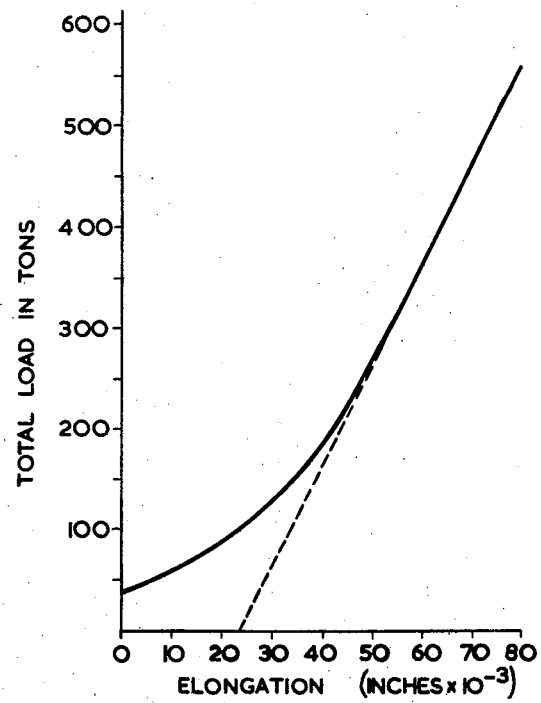
FIGURE 3 is a graph showing the variation of elongation of the mill with rolling load.

The above equation is accurate so long as there is a linear relationship between the separating force F and the resulting elongation of the mill housings. In practice, as will be seen from FIGURE 3 where the elongation is plotted against the separating force, this linear relationship is true only for loads exceeding a critical load represented by the ordinate of the point of intersection of the full and the broken lines of FIGURE 3. Provided that the mill is worked with loads always above this critical value, the control circuit gives an error signal on line 32 closely approximating to the actual gauge error, $\Delta h$. However, recent developments in the design of rolling mill housings have produced instances where the normal rolling load is lower than the critical load. In this case, as can be seen from the lower portion of the curve of FIGURE 3, the relationship between F and the elongation of the housings diverges increasingly from direct proportionality as represented by the broken line, and the signal on line 32 will differ from the true gauge error. In order that the control circuit shall give an accurate indication of gauge error, there is added to the signals applied to the control circuit 27 a further, compensation, signal which is equal to the departure of the curve of FIGURE 3 from the straight line for every value of load that is likely to be met in practice. The equation then becomes $$F/M + S_0 - h + f(F) = \Delta h$$

where $f(F)$ is the compensation value depending on the rolling load F and which is zero for values of the rolling load exceeding the critical value. This equation is effectively solved by the control circuit 27.

Figure 4:
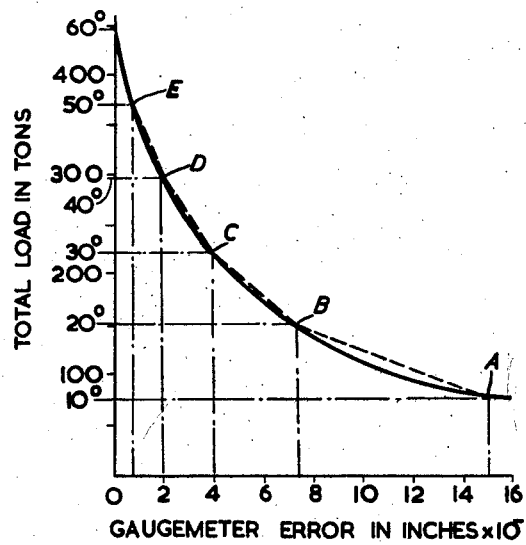
FIGURE 4 is a graph showing the correction required for different mill loads.

The values of the compensation factor $f(F)$ for different values of the rolling load may be obtained by screwing down the mill, with no strip between the rolls 12, until the mill load exceeds the critical value. The knob 30 is set to zero gauge and the signals on lines 26, 28 are adjusted until the output signal 32 is zero. The screw-down setting ($S_0$) is then progressively increased to decrease the rolling load F, the rolling load and the error signal on the line 32 being measured at intervals. A curve similar to that shown in FIGURE 4 is then obtained and it will be observed that the gaugemeter error, as indicated by the value of the signal on line 32, increases progressively as the rolling load is decreased. The ordinate in FIGURE 4 is the total load in tons, as measured by the sum of the outputs of the load cells 18.

In order to compensate for the gaugemeter errors, the signals from the second set of strain gauges on the load cells 18 are applied on the line 34 to a load-meter 35 which gives a mechanical indication of the subsisting mill load F. Load-meter 35 drives a potentiometer 36 which is arranged to give the error correction signal on line 37 appropriate to the value of the rolling load. The compensation signal on line 37 is added to the signals on lines 26, 28 in the control circuit 27, with the result that the error signal on line 32 is substantially equal to the true gauge error for all values of rolling load.

Figure 2:
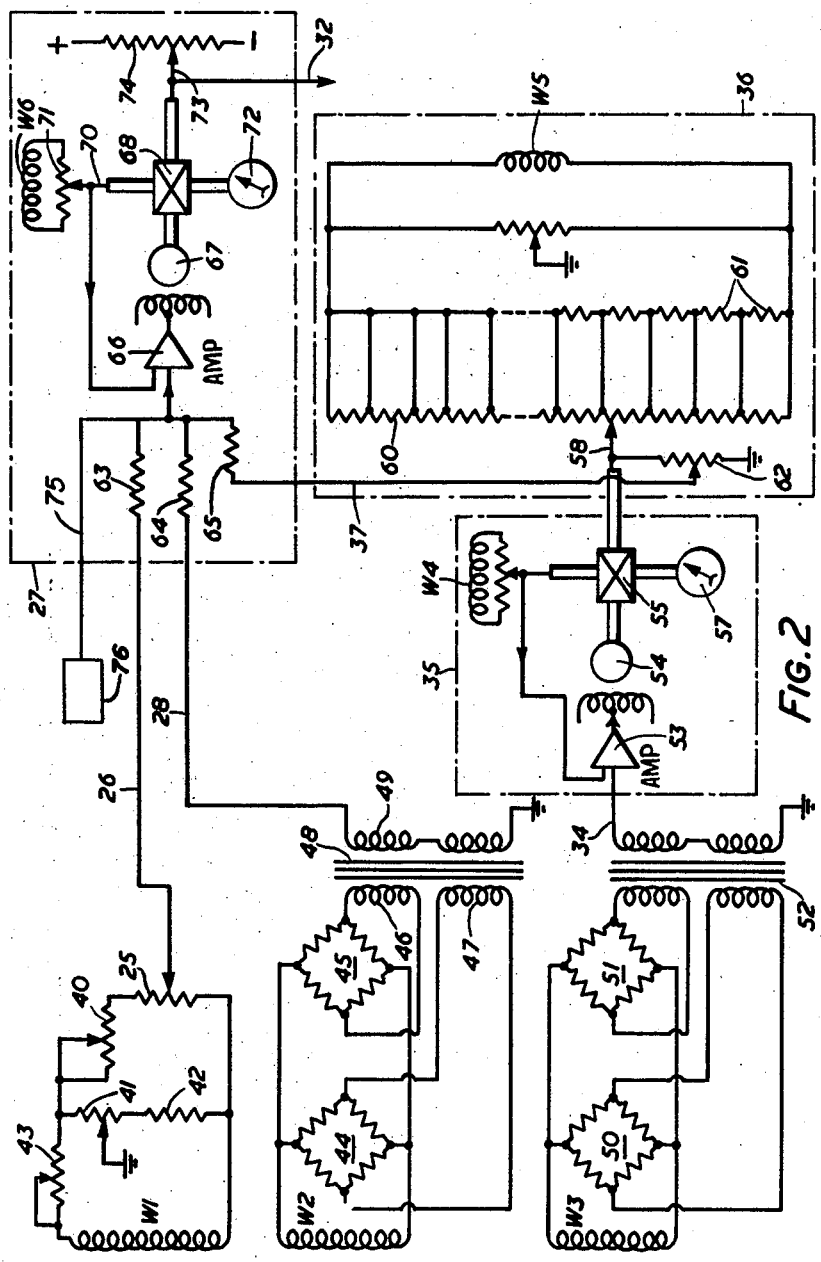
FIGURE 2 is a schematic circuit diagram of the control system.

Turning now to FIGURE 2 which shows in greater detail the control circuit, the roll setting potentiometer 25 is connected in a bridge circuit with a setting potentiometer 40, a potentiometer 41, the sliding contact of which is actuated by the $h$ knob 30, and a resistor 42. An alternating current is supplied to the bridge from a winding W1 through a second setting potentiometer 43 and the out of balance voltage is obtained from the slider of potentiometer 25, the sliding contact of potentiometer 41 being earthed. The voltage appearing on the sliding contact of potentiometer 25 represents the value ($S_0-h$), the setting potentiometer 40 being adjusted for this purpose.

44 and 45 represent one strain gauge bridge of each of the two load cells 18. The bridges 44, 45 are energised by a second secondary winding W2 and the out of balance voltages from the two bridges are applied to the primary windings 46, 47 of a transformer 48. The secondary winding 49 of transformer 48 is earthed at one end and a signal proportional to F appears at the other end of winding 49 on line 28. The setting potentiometer 43 is adjusted so that the factor M is appropriately introduced. This is done by setting the knob 30 to zero gauge, forcing the rolls 12 together, with no strip therebetween, until the critical load is exceeded, and adjusting setting potentiometer 43 until the sum of the voltages on lines 26, 28 is zero.

The remaining strain gauge bridges 50, 51 of the load cells 18 are connected similarly to bridges 44, 45 and are energised by a third secondary winding W3. The out of balance voltages are applied to a transformer 52 and the voltage across the secondary winding of this transformer, which is proportional to the rolling load F, is applied on line 34 to a high gain amplifier 53. The output of amplifier 53 feeds a servo motor 54 the rotor of which is connected to a gear box 55 having a large step-down ratio. Gear box 55 drives the sliding contact of a potentiometer 56 which is energised by a further secondary winding W4 and the voltage appearing on that sliding contact is fed back to the input of amplifier 53 in opposition to the voltage from transformer 52. By means of the feedback from potentiometer 56, the motor 54 is accurately driven through an angular distance proportional to the rolling load signal on line 34. Gear box 55 also drives an indicator 57 showing the existing rolling load and the sliding contact 58 of a further potentiometer 60. The position of sliding contact 58 on potentiometer 60 is then dependent on the existing rolling load.

Potentiometer 60 is designed to produce the error correction voltage in accordance with the existing value of the rolling load F which sets the sliding contact 58. Potentiometer 60 is a linear potentiometer but is made non-linear by shunting resistors 61 connected across tappings on the potentiometer. The potentiometer 60 is energised by a further secondary winding W5 connected across its ends. Thus, if the scale of the load meter indicator 57 covers 270° and a load range of 1,000 tons, potentiometer 60 may be tapped at intervals corresponding to 10° of the load meter indicator scale, or every 37 tons. Reverting to FIGURE 4, the angular positions of the indicator 57 corresponding to the appropriate rolling loads are shown at 10° intervals. The gauge meter errors at 10°, 20° etc. are then shown at A, B, C, D, E. Straight lines AB, BC, CD, DE represent the mean variation in gauge meter error with load over the 10° ranges of the indicator 57. The ratios of the shunting resistors 61 are selected to equal the ratios of the inclinations of the straight lines AB, BC etc. The upper tapped portions of potentiometer 60 corresponds to high rolling loads, exceeding the critical value, and here the tappings are shorted out, since no correction signal is required.

The sliding contact 58, the voltage of which is approximately proportional to the gauge meter errors indicated on FIGURE 4, is connected across an auxiliary potentiometer 62, the sliding contact of which is connected to the line 37.

The voltages on line 26, line 28 at line 37 are summated by connecting them through resistors 63, 64, 65, respectively, to the input of a high gain amplifier 66. The output of amplifier 66 feeds a servo motor 67, the rotor of which is connected to a gear box 68 having a large step-down ratio. Gear box 68 drives the sliding contact 70 of a further potentiometer 71 energised by a further secondary winding W6. The voltage on sliding contact 70 is fed back to the input of amplifier 66 in opposition to the voltage derived from resistors 63, 64, 65. As a result, the rotor of servo motor 67 turns through an angle accurately equal to the voltage derived from the combined voltages on the slider of potentiometer 25 and lines 26, 37. Gear box 68 also drives a gauge error indicator 72 and the slider 73 of a potentiometer 74. The voltage on the line 73 is applied on the line 32 in order to control the screwdown motor 17 and/or the reeling motor 23.

The resistors 63, 64, 65 are selected so that the voltage applied to amplifier 66 is equal to $$F/M + (S_0 - h) + f(F)$$

i.e. the gauge error $\Delta h$. $F/M$ is derived from line 28, $(S_0 - h)$ is derived from line 26, and $f(F)$, the compensation voltage, is derived from line 37. Thus, the signal on line 32 derived from potentiometer 74 accurately represents the gauge error $\Delta h$ for all values of rolling load, including those below the critical value.

If the knob 30 is set to zero and line 32 disconnected from the control circuit 24 and/or contactor gear 33, the indicator 72 indicates the thickness of the strip issuing from the mill.

The windings W1–W6 are preferably all secondary windings of a transformer, the primary winding of which is energised by a 400 cycle generator or other alternating current supply.

There is also applied to the input of amplifier 66 on line 75 a voltage from a tacho-generator 76 driven by the rolls, that voltage representing the angular speed of the rolls 12 in order to compensate for variations in the thickness of the oil film of the bearings for rolls 12, 13, when those bearings are hydrodynamically lubricated, since the thickness of the oil film varies with the speed of the rolls. Also in accordance with standard gauge-meter practice, a flying micrometer or other device directly measuring the thickness of the strip between the rolls 12 and the reel 22 may be supplied to monitor and to correct long-term errors in the gauge-error circuit described, these errors being caused by thermal and other drift of the circuits.

While the automatic thickness control has been described as applied to a rolling mill, it may also be applied to drawing apparatus having dies. The nominal separation of the die surfaces and the separating force generated by the passage of material therebetween are detected as before and signals corresponding to those for the rolling mill are generated on lines 26, 28, 34.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. Apparatus for indicating the departure from a desired value of the thickness of elongate material issuing from between the rolls of a rolling mill, comprising means for generating a first signal in accordance with the separating force developed between the rolls by the material therebetween, means for generating a second signal in accordance with the nominal setting of the rolls, means for generating a third signal in accordance with a required thickness of the material, means for generating a fourth signal in accordance with the speed of the mill, means responsive to said separating force for generating a compensation signal determined by said separating force but non-linearly related thereto, and means for combining together said first, second, third, fourth and compensating signals to form a resultant signal representing the departure of the thickness from said required value.

2. Apparatus, according to claim 1, in which said means for generating said fourth signal comprises a tacho-generator driven by said rolls.

References Cited in the file of this patent
UNITED STATES PATENTS

| | | |
|---|---|---|
| 2,264,096 | Mohler | Nov. 25, 1941 |
| 2,303,596 | Zeitlin | Dec. 1, 1942 |
| 2,342,374 | Shayne et al. | Feb. 22, 1944 |
| 2,726,541 | Sims | Dec. 13, 1955 |
| 2,771,579 | Ruge | Nov. 20, 1956 |

FOREIGN PATENTS

| | | |
|---|---|---|
| 571,793 | Canada | Mar. 3, 1959 |

OTHER REFERENCES

Control Engineering, October 1957, pages 74–80. (Copy in Scientific Library.)